Patented Dec. 12, 1950

2,534,028

UNITED STATES PATENT OFFICE 2,534,028

PRODUCTION OF POLYETHYLENE TEREPHTHALATE

Emmette Farr Izard, Kenmore, N. Y., assignor to E. I. du Pont de Nemours & Company, Wilmington, Del., a corporation of Delaware No Drawing. Application May 13, 1948, Serial No. 26,915

2 Claims. (Cl. 260—75)

This invention relates to an improved method for preparing a synthetic linear polyester which is essentially the condensation product of a dihydric alcohol and a dibasic acid, and more particularly to the preparation of polyethylene terephthalate, a fiber-forming synthetic linear polyester.

The production of the novel class of fiber-forming, linear polyesters of terephthalic acid and a glycol of the series $HO(CH_2)_nOH$ where $n$ is an integer from 2 to 10 inclusive, is fully disclosed in copending Whinfield and Dickson application Serial No. 618,398, filed September 24, 1945 now U. S. Patent 2,465,319. From the commercial standpoint one of the most attractive polymers of this class is polyethylene terephthalate, and the most promising process for its production comprises carrying out an ester interchange between ethylene glycol and dimethyl terephthalate to form bis-2-hydroxy-ethyl terephthalate monomer which is polymerized to polyethylene terephthalate under reduced pressure (below atmospheric pressure) and at elevated temperatures.

However, in the practice of this process it was observed that dimethyl terephthalate and ethylene glycol, when used in the highly purified state (obviously essential to the formation of a uniform high quality product), were very sluggish with respect to ester interchange. It was noted that finely purified reagents would undergo the interchange, but the reaction was still too slow for commercial use. Also, it was found on analysis that actually the polymer was not pure polyethylene glycol terephthalate but rather a copolymer with diethylene glycol terephthalate, the presence of the diethylene glycol residues in the polymer chain being the result of dimerization of ethylene glycol during the polymerization process. There appear to be three factors influencing the extent of the dimerization: time, temperature and catalyst. It seems that high temperatures and, of course, long polymerization cycles (necessary if catalyst is not used) favor the formation of diethylene glycol. The presence of the diethylene glycol residue in the polymer chain changes the properties of the resultant polymer when present in quantities larger than 2%–3%, and results in a yarn having impaired physical and chemical properties. Furthermore, the diethylene glycol component tends to lower the melting point and increase the tendency of the resultant polymer to degrade under stringent conditions of chemical action. Many catalysts have been suggested for speeding up the reaction at lowered temperatures whereby to inhibit the undesirable formation of diethylene glycol, and to render the process commercially attractive. Suggested catalysts heretofore found useful in ester interchange reactions are sodium, lithium, potassium, calcium, magnesium, zinc, cadmium, and manganese, as well as alkali metals in the form of their carbonates or other alkaline-reacting salts, for example, the borates; also the oxides of various of these metals. These catalysts, however, are not useful over the entire range of molecular weights desired in the final polymer, and while many of them can produce polymeric ethylene terephthalate with an intrinsic viscosity in the vicinity of 0.6–0.7, when a polymeric material is desired having an intrinsic viscosity in the vicinity of 1.0–2.0, these catalytic materials are not satisfactory.

The expression "intrinsic viscosity," denoted by the symbol $(\eta)_0$, is used herein as a measure of the degree of polymerization of the polyester and may be defined as $$\text{limit } \frac{\ln(\eta_r)}{C} \text{ as } C \text{ approaches } 0$$

wherein $\eta_r$ is the viscosity of a dilute phenol-tetrachlorethane (60:40) solution of the polyester divided by the viscosity of the phenol-tetrachlorethane mixture per se measured in the same units at the same temperature, and C is the concentration in grams of polyester per 100 cc. of solution.

An object of this invention therefore is to accelerate and desirably control the reaction between ethylene glycol and dimethyl terephthalate and the subsequent polymerization of the resulting reaction product.

Another object is to prepare from ethylene glycol and dimethyl terephthalate, by a simple and economical expedient, fiber-forming polyethylene terephthalates substantially free of copolymers of polyethylene terephthalate with diethylene glycol terephthalate.

Still another object is to satisfactorily catalyze the ester interchange between ethylene glycol and dimethyl terephthalate and the subsequent polymerization whereby to form a fiber-forming linear polyester of high quality. These and other objects will more clearly appear hereinafter.

Unexpectedly I have found that the ester interchange between ethylene glycol and dimethyl terephthalate, and subsequent polymerization of the resulting bis-2-hydroxy-ethyl terephthalate under super polyester-forming conditions is accelerated to a satisfactory degree in the presence of catalytic amounts of litharge (PbO) and that the resulting linear polyesters are of the desired high intrinsic viscosity and are substantially free, i. e., contain less than 3%, of diethylene glycol residue in the polymer chain. Accordingly the present invention comprises reacting ethylene glycol and dimethyl terephthalate at atmospheric pressure and at elevated temperatures in the presence of catalytic amounts of litharge to form methanol and bis-2-hydroxy-ethyl terephthalate monomer and thereafter further condensing the monomer, in the presence of litharge as catalyst, at still higher temperatures and under reduced pressure to form polyethylene terephthalate with the elimination of ethylene glycol. The polymerization step is continued until a polymer of the desired intrinsic viscosity, i. e., degree of polymerization, is obtained.

For purposes of this invention litharge may be used in a reasonably wide range of catalyst concentrations. As little as 0.005% of litharge will give a noticeable improvement and concentration up to 1% may be used with advantage. However litharge in the higher concentrations tends to color the polymer and in those instances where a very white polymer is desired, it is advisable to use not over 0.01% of the catalyst. Of course, it will be realized that with very low percentages, the polymerization reaction will tend to be relatively slow. With larger amounts of catalyst, the reaction will be greatly increased and for uses where an absolute white end material is not essential, such conditions are very satisfactory. Thus, where a catalyst concentration of 0.01% litharge at 275° C. gives a polymer with an intrinsic viscosity of 0.7 at the end of 8 hours, 1% of litharge at 262° C. will give an intrinsic viscosity of 0.7 in as little as 0.5 hour or an intrinsic viscosity of 1.7 in 23 hours. In general, the higher the intrinsic viscosity desired, the larger the amount of catalyst that should be used.

The initial condensation which may be regarded as essentially a simple ester interchange in accordance with the following reaction:

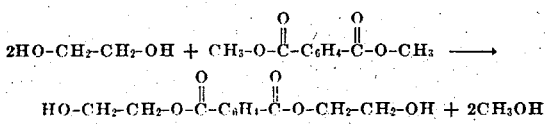

may be conveniently carried out at atmospheric pressure and at a temperature range between 140°–220° C., and preferably between 150°–200° C. Of course, the reaction may be carried out under pressures above or below atmospheric pressure, if desired. However, it can readily be seen that an economic advantage resides in conducting the reaction at atmospheric pressure.

The polymerization reaction may be effected in either the liquid (i. e., melt) or solid phase. In the liquid phase the reaction must be carried out at reduced pressure in the vicinity of 0.05–20 millimeters of mercury with the range 0.05–5.0 mm. Hg preferred for optimum results. This reduced pressure is necessary to remove the free ethylene glycol which emerges from the polymer as a result of the condensation reaction, since the reaction mixture is very viscous. If reduced pressure is not used, all of the ethylene glycol will not be removed, and it will not be possible to form a fiber-forming polymeric material, but rather a low molecular weight polymer, too brittle for fibers. A temperature between about 230 to about 290° C. and preferably between about 260 to about 275° C. should be maintained during the polymerization step. Since low temperatures necessitate an excessive length of time, the higher temperatures within the preferred range will generally be used in commercial operations.

The ester interchange portion of the reaction usually takes from 1 to 5 hours. The polymerization cycle, however, may take longer, generally being 1–30 hours after a full vacuum has been achieved. The actual length of time required varies of course with catalyst concentration, temperature, intrinsic viscosity desired, amount of color allowable in the finished polymer and many other such items. In general, it is desired not to have too long a polymerization cycle, both for economic reasons and since in a polymerization cycle that is too long, the competing and irreversible thermal degradation reaction will have sufficient time to lower the intrinsic viscosity more than the polymerization reaction can raise it.

The following examples further illustrate the principles and practice of this invention and demonstrate the advantages thereof. Parts and percentages are by weight unless otherwise indicated.

In each of the examples immediately following, a reaction mixture is prepared consisting of 20 parts of dimethyl terephthalate, 22.3 parts of ethylene glycol and an amount of catalyst as indicated in the Table I. The reactants are heated to 195° C. at atmospheric pressure in a reaction vessel until the ester exchange is complete as shown by the cessation of the evolution of methanol from the reaction mixture. The resulting reaction product is then subjected to a vacuum and heated to the temperature indicated in the table; the entire mixture being agitated by bubbling oxygen-free nitrogen through the molten mass. The polymerization reaction is continued for a period of time as indicated below at a pressure of about 0.05–1.0 mm. Hg. At the end of the polymerization cycle the reaction vessel is cooled, causing the polymeric material to solidify. Determinations for intrinsic viscosity gave values as shown in the tables. It will be noticed that litharge even in low concentrations gives high molecular weight polymer. A control example is included for comparative purposes.

Table I

| Example | Per Cent Catalyst (Based on Weight of Dimethyl Terephthalate) | Time, hrs. | Temp., °C. | Intrinsic Viscosity |
|---|---|---|---|---|
| Control | 0.1% magnesium formate. | 23 | 256 | 0.70 |
| 1 | 0.02% PbO | 23 | 259 | 0.84 |
| 2 | 0.05% PbO | 23 | 259 | 1.34 |
| 3 | ....do | 20 | 262 | 1.27 |
| 4 | 1.0% PbO | 23 | 262 | 1.68 |

To demonstrate that the improvement obtained by the use of the modifiers of this invention is not restricted to any one process of polymerization, the following example of solid phase polymerization is illustrative.

EXAMPLE 5

A low molecular weight "half-made" polymer (intrinsic viscosity 0.2) is prepared from dimethyl terephthalate and ethylene glycol using 0.05% litharge (PbO) as catalyst by the process of the examples in Table I. This polymer is then cooled to a brittle solid which is ground and the material ranging from 42–100 mesh in particle size is placed in a jacketed tube having an opening in the bottom for the entrance of nitrogen.

The temperature of the polymer is raised to the vicinity of 243° C. and at the same time nitrogen is admitted to the bottom of the tube at 0.14 cc. per gram of polymer per sec. The nitrogen allows for better heat transfer characteristics and at the same time takes off the product of condensation (ethylene glycol) and excludes oxygen. The condensation was allowed to continue in the solid phase under static bed conditions for 16 hours. The resulting polymer exhibited an intronsic viscosity of 0.8.

As stated previously, in general, when catalysts other than litharge are used in connection with the preparation of polyethylene terephthalate, the resultant polymer has a considerable content of diethylene glycol residue, i. e.

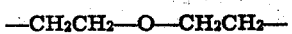

instead of —CH$_2$CH$_2$—. The presence of this residue as part of the polymer in excess of 2-3 mol per cent results in poor quality yarn. The following two comparative examples show the lower diethylene glycol residue content of a polymer prepared using litharge catalyst.

In a reaction vessel are mixed together 1000 parts of dimethyl terephthalate, 1000 parts of ethylene glycol and an amount of catalyst as shown in Table II. The reaction vessel is then heated to 215° C. until the ester exchange is completed as shown by cessation of the evolution of methanol. The temperature is then raised to 265° C. to gradually drive off the excess ethylene glycol. When no more glycol is driven off the temperature is raised to 275° C. and the reaction mass is gradually placed under vacuum. After about 1 hour the pressure reaches a value of 0.5 mm. Hg absolute. The polymerization cycle is then carried out for a length of time as shown below, while stirring the molten mass. At the end of that time the polymer is cooled and determinations run for intrinsic viscosity and diethylene glycol terephthalate content, values for which are shown below:

*Table II*

| Example | Percent Catalyst (Based on Weight of Dimethyl Terephthalate) | Time, hrs. | Intrinsic Viscosity | Diethylene Glycol content (mol per cent) |
|---|---|---|---|---|
| Control | 0.10% zinc stearate | 4.7 | 0.68 | 7.3 |
| 5 | 0.01% PbO | 5.3 | 0.66 | 3.0 |

By using the catalyst of this invention, polyethylene terephthalates may be prepared which possess very high intrinsic viscosities, in the vicinity of 1.0 or greater, not heretofore obtainable, and which are particularly useful in the form of filaments, yarns, films, coatings, etc.

Another advantage to be derived from this invention is that the resultant polyethylene terephthalates have very low contents of diethylene glycol in the polymeric chains. This is especially advantageous, since larger quantities of this material tend to degrade the physical properties and the chemical stability of the polymeric material.

As stated hereinabove polyethylene terephthalate is the preferred polymer and the present invention has been described with particular reference to this polymer. However, litharge also effectively catalyzes the ester interchange between ethylene glycol and terephthalate esters of saturated aliphatic monohydric alcohols containing up to and including four carbon atoms, e. g., diethyl, dipropyl, and diisobutyl terephthalates.

As many widely different embodiments can be made without departing from the spirit and scope of my invention it is to be understood that said invention is not to be restricted in any way except as set forth in the appended claims.

I claim:

1. A process for producing fiber-forming polyethylene terephthalate which comprises reacting ethylene glycol and dimethyl terephthalate in the presence of a catalytic amount of litharge at a temperature of from 140° to 220° C. until no further methanol is liberated, and thereafter continuing reaction in the presence of said litharge at a temperature of from 230° to 290° C., and at a pressure of from 0.1–20 millimeters of mercury until a fiber-forming linear polyester is formed which has an intrinsic viscosity of at least 0.8 and contains not over 3.0 mol per cent of diethylene glycol in the polymer chain.

2. The process of claim 1 wherein from 0.005% to 1% by weight, based on the weight of dimethyl terephthalate, of litharge, is used as catalyst.

EMMETTE FARR IZARD.

REFERENCES CITED

The following references are of record in the file of this patent:

UNITED STATES PATENTS

| Number | Name | Date |
|---|---|---|
| 1,979,260 | Gauerke | Nov. 6, 1934 |
| 1,980,441 | Lawrence | Nov. 13, 1934 |
| 2,066,363 | Patterson | Jan. 5, 1937 |
| 2,465,319 | Whinfield et al. | Mar. 22, 1949 |

FOREIGN PATENTS

| Number | Country | Date |
|---|---|---|
| 578,079 | Great Britain | June 14, 1946 |

Certificate of Correction

Patent No. 2,534,028 December 12, 1950

EMMETTE FARR IZARD

It is hereby certified that error appears in the printed specification of the above numbered patent requiring correction as follows:

Column 4, line 55, in the table, fourth column thereof, for "256" read *259*; column 5, line 10, for "intronsic" read *intrinsic*;

and that the said Letters Patent should be read as corrected above, so that the same may conform to the record of the case in the Patent Office.

Signed and sealed this 6th day of March, A. D. 1951.

[SEAL]

THOMAS F. MURPHY,
*Assistant Commissioner of Patents.*